United States Patent Office 3,506,696
Patented Apr. 14, 1970

3,506,696
CONTINUOUS HIGH TEMPERATURE STEAM DEODORIZATION OF EDIBLE OILS
Joseph S. Baker, Green Township, Hamilton County, and James B. Edwards, Cincinnati, Ohio, assignors to The Procter & Gamble Company, Cincinnati, Ohio, a corporation of Ohio
No Drawing. Filed Apr. 22, 1968, Ser. No. 723,308
Int. Cl. C11b 3/14
U.S. Cl. 260—428     9 Claims

ABSTRACT OF THE DISCLOSURE

A process for continuous high temperature (350–500° F.) steam deodorization of edible oils in a packed chamber wherein the packing material has a packing factor less than about 100. Hot deaerated oil is passed downward through the packed chamber, countercurrent to a stream of steam. The process is particularly characterized by its high capacity (up to about 5000–10,000 pounds per hour per square foot of packed chamber cross section, depending on packing material), its low steam usage (about 0.1–1.0% by weight of the oil deodorized), its rapidity (about 2 minutes residence time typically required for deodorization at 480° F.), and its moderate vacuum requirements (about 0.1–50 mm. Hg in the lower portion of the packed chamber).

BACKGROUND OF THE INVENTION

The field of this invention is the processing of edible fats and oils. The invention relates to continuous countercurrent steam deodorization of edible oils at high temperatures. More specifically, it relates to a process for continuous steam deodorization of edible oils containing odoriferous materials, by passing edible oil down through a packed chamber while passing steam up through the chamber countercurrent to the oil.

Steam deodorization of edible oils is the removal, by various kinds of steam contacting, of free fatty acids and volatile odoriferous and flavorous materials which are responsible for the smell and taste of undeodorized oil. In processing edible oils, steam deodorization usually occurs after (1) refining, which removes gross amounts of impurities from the oils; (2) adsorptive bleaching, which adsorbs certain coloring materials from the oils with bleaching earth; and (3) hydrogenation (in the case of hydrogenated oils), which allows the separation of remaining odoriferous materials to be more easily accomplished.

Continuous deodorization of edible oils, in packed chambers and otherwise, is known. Usually, however, the amount of steam required has been in excess of about 3 or 4 percent by weight of the oil deodorized, and almost always in excess of about 1 percent. When adequate steam deodorization has been possible with less than 1 percent, a very high vacuum has been required. See, for example, U.S. Patent 2,674,609, granted Apr. 6, 1954, to Beal and Lancaster, which describes the steam deodorization of glyceride oils with low quantities of steam, but only at the high vacuum of 20 to 60 microns (0.02–0.06 millimeters) of mercury. However, vacuum systems capable of maintaining vacuums below about 0.1 millimeter of mercury (mm. Hg) require large amounts of energy (for example steam, in the case of steam ejection vacuum systems) to maintain the vacuum, which can easily offset the reduction in the amount of steam used for deodorization per se. In situations where this degree of vacuum is infeasible or uneconomical, greater amounts of steam have been required for deodorization. Vacuums of about 0.1 to 50 mm. Hg are readily attainable, however, for example by using steam ejection systems. Hence, there has been a need in the art for a process for continuous deodorization of edible oils with low steam usage and moderate vacuum requirements.

SUMMARY OF THE INVENTION

In view of the above stated need, the present invention provides a process for continuously deodorizing an edible oil containing odoriferous materials in a deodorization zone, the residence time of the oil within the deodorization zone ranging from about 30 seconds to about 10 minutes, which comprises continuously:

(1) deaerating a feed stream of oil to be deodorized to a level of less than about 0.10% by volume of dissolved oxygen;
(2) heating the deaerated oil to a temperature of about 350° F. to about 500° F.;
(3) introducing the deaerated oil into the upper portion of a vertical deodorization zone containing a packing material having a packing factor less than about 100;
(4) allowing the oil to flow downward through the deodorization zone;
(5) introducing a feed stream of steam into the lower portion of the deodorization zone, countercurrent to the flow of oil, to volatilize the odoriferous materials in the oil and deodorize the oil;
(6) withdrawing deodorized oil from the lower portion of the deodorization zone; and
(7) withdrawing the steam and the volatilized odoriferous materials from the upper portion of the deodorization zone;

the height of the packing material ranging from about 3 to about 120 feet; the feed ratio of oil to steam ranging from about 1000:1 to about 100:1 by weight; the pressure within the lower portion of the deodorization zone ranging from about 0.1 to about 50 mm. Hg absolute; and the temperature within the deodorization zone ranging from about 350 F. to about 500° F.

The above process makes possible adequate steam deodorization of edible oils with low steam usage (about 0.1 to about 1.0 percent by weight of the oil deodorized), yet requiring only a moderate vacuum system (about 0.1 to about 50 mm. Hg in the lower portion of the deodorization zone). Furthermore, it is possible to deodorize oils rapidly (about 2 minutes residence time typically being required for deodorization at 480° F.) and in large quantities (up to about 5000 to about 10,000 pounds of oil per hour per square foot of packed deodorization zone cross section, depending on the packing material used).

DETAILED DESCRIPTION

The edible oils which can be deodorized by the process of this invention include various substances of plant or animal origin which consist predominantly of glyceryl esters of fatty acid, e.g., triglycerides, including both those commonly called "oils" which are liquid at atmospheric pressure and temperature, and those commonly called "fats" which are solid or semisolid under these conditions, but liquid at the temperature of deodorization (i.e., about 350° F.–500° F.). Preferred oils are tallow, lard, and the common edible vegetable oils used for the production of salad oil and shortenings, e.g., cottonseed, peanut, safflower, palm, soybean, rapeseed, sunflower, corn, and coconut oils. The invention is particularly applicable to the deodorization of soybean oil.

The deodorization zone per se and its components (other than the packing material, which is described below) can be any type of packed vapor-liquid contacting chamber, such as those which are well known in the chemical engineering art. See, for example, R. H. Perry et al., eds., Chemical Engineers' Handbook (McGraw-Hill, 4th ed., 1963), pp. 18–25 to 18–53; J. S. Eckert et al., Chemical Engineering Progress 54, No. 1, 70–75 (January 1958, 57, No. 9, 54–58 (September 1961), 59, No. 5, 76–82 (May 1963), and 62, No. 1, 59–67 (January 1966); and K. E. Porter, Chemistry and Industry 182–89 (Feb. 4, 1967). Thus, the deodorization zone is sometimes referred to herein as the "deodorization chamber," the "packed chamber," or simply the "chamber."

The packing material used in the process of this invention should have a packing factor less than about 100, and should also preferably have a high capacity for film surface renewal.

Packing factors are experimentally determined constants, relating capacity and pressure drop characteristics of packing materials. A rough approximation (usually within about 50%) of the packing factor of a packing material is given by the surface area per volume of the packing material (square feet per cubic foot) divided by the cube of the void fraction of the packing material in the chamber. Packing factors can be more accurately determined experimentally (usually within about 5%) in a packed chamber by observing the capacity and pressure drop characteristics of the packing material, and using this data in combination with published information correlating packing factor to liquid and gas flow rates, densities, and viscosities. A chart useful for such a correlation is found, for example, in J. S. Eckert, Chemical Engineering Progress 59, No. 5, 76–82 (May 1963), at page 77. Calculations are generally not necessary, however, since packing factors for commercially available packing materials are published.

By "capacity and pressure drop characteristics" of the packing material is meant the pressure drop which results from high gas flow rates. In any packed chamber used for counter-current liquid-gas contacting, an increase in gas flow rate causes an increase in the gas phase pressure differential from one end of the chamber to the other. This differential is commonly referred to in the packed chamber art as the "pressure drop." A packing material with a low packing factor allows high gas flow rates with a low pressure drop, but can provide comparatively inefficient performance, due to less liquid-gas contact. A low pressure drop within the packed chamber is desirable in practicing the process of the present invention, because high pressure drops increase the possibility of flooding the packed chamber. A pressure drop in excess of about 2.8 mm. Hg per linear foot of packing material makes highly likely the flooding of the packed chamber. Pressure drops as high as 2.8 mm. Hg per foot represent an upper limit to prevent flooding, however, and are not preferred. The preferred pressure drop ranges from about 0.05 to about 0.5 mm. Hg per foot. On the other hand, efficient deodorization is needed. Thus, a combination of conditions, including the packing factor, provides the advantageous process described herein.

In addition to a packing factor less than about 100, the packing material should preferably have a high capacity for film surface renewal. Film surface renewal is the exposure of new portions of a liquid to the surface as a film is allowed to flow through a packing material. Film surface renewal is not susceptible to precise quantitative measurement, although the relative performance of different packing materials can be compared, e.g., by experimentally determining relative deodorization capabilities of different packing materials.

Examples of packing materials which have acceptable packing factor and film surface renewal are "Pall rings," "Hyperfil packing," "Stedman packing," "Sulzer packing," and Raschig rings, all of which are described by K. E. Porter et al. in Chemistry and Industry 182–188 (Feb. 4, 1967). Of these packings, the most highly preferred are ⅝ inch, 1 inch, 1½ inch, and 2 inch "Pall rings."

"Pall rings" are a commercially available packing material (U.S. Stoneware Company, Akron, Ohio); similar packing is sold under the name "Flexiring" (Koch Engineering Company, Inc., Wichita, Kans.). These rings are stamped, preferably from stainless steel, and formed into open-ended cylinders of approximately equal outer diameter and height. The sides of the cylinders comprise 10 holes per cylinder formed by punching material from the sides to create 10 tongues extending into the center of the cylinder. Each tongue corresponds to, and is attached at the side of, a hole in the side of the cylinder. Except for the holes and tongues, the packing is similar to Raschig rings. Characteristics of the rings are more fully described by J. S. Eckert et al. in Chemical Engineering Progress 54, No. 1, 70–75 (January 1958); 57, No. 9, 54–58 (September 1961); 59, No. 5, 76–82 (May 1963); and 62, No. 1, 59–67 (January 1966), incorporated herein by reference.

The packing material is preferably made from stainless steel. Ceramic packings can also be used, however, if they are of sufficient stability that they do not fracture in the tower.

These preferred packings (stainless steel Pall rings) have approximately the following oil flow rate capacities, measured in pounds of oil per hour per square foot of packing material, and packing factors:

|  | Capacity | Packing factor |
| --- | --- | --- |
| ⅝ inch | 5,000 | 70 |
| 1 inch | 6,500 | 50 |
| 1½ inch | 8,500 | 28 |
| 2 inch | 10,000 | 20 |

The approximate capacities of other packing materials are related by the formula $$C_2 = C_1 \sqrt{\frac{F_1}{F_2}}$$

where $C_2$ is the capacity of a packing material having a known packing factor $F_2$, and $C_1$ is the known capacity of a packing material having a known packing factor $F_1$.

By "capacity" of a packing is meant the practical upper limit of oil flow rate in a packed chamber containing such a packing. The lower limit is not related to capacity, as any packing material can be used at a flow rate less than its capacity, e.g., as low as 500 pounds per hour per square foot of packing material.

Although low packing factors are desirable in order to give high capacity, they are undesirable in certain respects, as well. First, the diameter of the chamber should be at least 10 times that of the packing material, e.g., the diameter of an individual ring of packing material, in order to reduce the amount of oil channeling which would otherwise occur. Hence larger packings with lower packing factors require larger diameter packed chambers. Moreover, larger packing factors in general have lower surface per unit volume, and a greater height of packing is required. Thus, in order to adequately deodorize oil, approximately the following heights of packing material should be used, depending on packing size:

⅝ inch Pall rings: from about 3 to about 60 feet, preferably from about 12 to about 20 feet.

1 inch Pall rings: from about 4 to about 75 feet, preferably from about 16 to about 24 feet.

1½ inch Pall rings: from about 5 to about 100 feet, preferably from about 18 to about 30 feet.

2 inch Pall rings: from about 6 to about 120 feet, preferably from about 20 to about 35 feet.

The preferred packing factor range is from about 50 to about 70, as this range yields a relatively high capacity in the packed chamber (from about 5000 to about 6500 pounds of oil per hour per square foot of packing), yet allows a relatively low chamber height (preferably from about 12 to about 24 feet) and diameter (as low as 6 to 10 inches minimum diameter).

The diameter of the chamber is adjusted to give the desired overall capacity, taking into account the capacity of the packing material and the desired minimum diameter of about 10 times the packing size to prevent channeling. However, for any given diameter of packed chamber, the individual packing material diameters should be as close as practical to a tenth of the size of the chamber diameter to give higher capacity.

For any given capacity, it is desirable to operate at between about 60% and about 75% capacity. Thus, for the preferred packing material with a packing factor ranging from about 50 to 70 and a capacity ranging from about 5000 to about 6500, the preferred oil flow rate is from about 3000 to about 5200 pounds of oil per hour per square foot of packing material.

The materials of the construction of apparatus used in the process of the invention should be selected so that at no time does oil over a temperature of about 150° F. come into contact with a material (such as carbon steel) which can damage the oil by repeated contact. It is therefore highly preferred to construct such apparatus, except the parts which do not come into contact with the oil, of stainless steel. A type of steel which is highly desirable for this purpose is American Iron and Steel Institute Type 304 stainless steel, which has the following chemical composition:

|  | Percent |
| --- | --- |
| Carbon | 0.08 maximum |
| Manganese | 2.00 maximum |
| Phosphorus | 0.045 maximum |
| Sulfur | 0.030 maximum |
| Silicon | 1.00 maximum |
| Chromium | 18.00–20.00 |
| Nickel | 8.00–12.00 |
| Iron | Balance |
|  | 100.00 |

In the process of this invention, oil to be deodorized is first deaerated to a level of less than about 0.10% by volume of dissolved oxygen, and preferably less than about 0.05%, prior to heating to the deodorization temperature, in order to prevent oxidation of the oil by dissolved oxygen. "Dissolved oxygen" is oxygen which becomes associated with the oil when it is exposed to the air or other oxygen-containing material, and can comprise up to about 2.5% (by volume) of a typical edible oil at room temperature (about 70° F.).

Deaerating the oil to a level of less than about 0.10% by volume of dissolved oxygen, and preferably less than about 0.05%, can be accomplished by subjecting the oil to a partial vacuum in a closed container, or by sparging, i.e., bubbling inert gas such as nitrogen through the oil.

Preferably, deaeration is accomplishsed by heating the oil and then subjecting the heated oil to a partial vacuum in a closed container. The temperature to which the oil is heated should not be so high as to damage the oxygen-containing oil. For example, soybean oil which is saturated with air at room temperature (about 70° F.) contains about 2.5% dissolved oxygen (by volume). This oil can safely be heated to about 220° F. without degradation. With this limitation, however, oils are more quickly deaerated at high temperatures.

In order to deaerate an oil in a closed container, sufficient time must be allowed for the dissolved air to flash from the oil. The time required depends on a number of variables, but can be reduced by decreasing the viscosity of the oil (e.g., by heating) and by increasing the surface area per unit volume of oil in the container (e.g., by spraying the oil into the dryer).

Preferred conditions for deaerating the edible oil comprise (1) heating the oil to be deaerated to a temperature of about 200° F. to about 220° F., and (2) passing the oil through a gas-tight container from which oxygen is continuously removed by a vacuum pump, so that the absolute pressure within the container is about 5 to about 50 mm. Hg. Oil is preferably distributed on surfaces (e.g., packing) within the upper portion of the container, so that in draining down, sufficient time is consumed to allow the dissolved air (including dissolved oxygen) to flash from the oil.

An additional feature which is preferably included in the deaeration process and which makes deaeration more efficient is the injection into the lower portion of the container of a countercurrent flow of steam, and withdrawing the steam from the upper portion of the container. The amount of steam used can be quite low, e.g., 0.25% by weight of the oil.

The oil is heated to a temperature of about 350° F. to about 500° F. after deaeration but prior to its introduction in the upper portion of the deodorization chamber. Lower temperatures are less effective in deodorizing the oil, but at temperatures over about 500° F. the oil suffers some degradation, even when it has been deaerated prior to heating. The preferred temperature to which the oil is heated is from about 450° F. to about 485° F. The temperature at any given point within the deodorization chamber generally corresponds to the oil temperature at that point. Thus, during deodorization, the temperature within the deodorization chamber ranges from the oil inlet temperature to the oil outlet temperature. Preferably, the difference between the oil inlet temperature and oil outlet temperature is less than about 75° F., most preferably less than about 40° F., and most highly preferably less than about 20° F. In any event, the minimum temperature within the deodorization chamber should be maintained above about 350° F. Thus, for an oil inlet temperature of from about 350° F. to about 500° F., the temperature within the deodorization chamber is within the range of from about 350° F. to about 500° F.

The steam temperature is not critical and can range from about the boiling point of water at the inlet pressure to about 600° F. Water can even be introduced in lieu of steam, since the water would be immediately vaporized and heated to the deodorization temperature by the hot deodorized oil in the lower portion of the deodorization chamber and any other materials which the water contacts. This is not preferred, however, as it cools the apparatus and makes deodorization less efficient. On the other hand, steam at a temperature in excess of about 600° F. can scorch the oil, and it is unnecessary to use such high temperature steam. It is preferred that the steam temperature be within about 20 Fahrenheit degrees of the oil temperature; cooler steam cools the oil, and hotter steam is unnecessary. Thus the preferred temperature of steam is broadly from about 330° F. to about 520° F.; when the oil is heated to within the preferred temperature range of from about 450° F. to about 485° F., the preferred steam temperature ranges from about 430° F. to about 505° F. The preferred temperature within the deodorization chamber corresponding to these conditions is within the range of from about 410° F. to about 485° F.

The process of the present invention is particularly characterized by its low steam usage, ranging from about 0.1 to about 1.0% steam by weight of the oil deodorized. This low steam usage is conveniently controlled and measured by the feed ratio of oil to steam. Feed ratios of about 1000:1 by weight (i.e., about 0.1% steam) have been found to adequately deodorize oils in most cases but in others a ratio of about 100:1 (i.e., about 1% steam) is required. Hence the desired ratio ranges from about 1000:1 to about 100:1. A ratio of about 400:1 to about 200:1 is preferred.

The time required for deodorization depends on deodorization temperature, amount and volatility of the odoriferous materials to be volatilized, and pressure within the deodorization chamber. Under the conditions of the process of the present invention, however, the residence time of the oil within the packed chamber ranges from about 30 seconds to about 10 minutes, and most edible oils are adequately deodorized in about 1 to about 4 minutes within the preferred pressure ranges described below and within the preferred temperature range of about 450° F. to about 485° F.

It is to be understood that oil residence time wtihin the packed chamber depends upon several variables, for example, the packing type and size, height of packing material, and steam and oil flow rates. Other factors being equal, it can be said in general that increasing packing size and decreasing height of packing material, each decrease the residence time within the packed chamber. A low residence time requires a high quantity of steam for adequate deodorization, however. Thus, a packed chamber of greater height yields a higher residence time, but a lower steam usage.

A pressure ranging from about 0.1 to about 50 mm. Hg is maintained within the lower portion of the packed chamber, i.e., at that point at which the steam is introduced into the packed chamber and initially contacts the oil. All pressures designated herein are absolute pressures, unless otherwise indicated. Low pressure is desirable because it aids in volatilizing odoriferous materials in the oils, and because it maintains an oxygen-free atmosphere, thereby preventing oxidation of the oils. Furthermore, more steam is required when the pressure in the lower portion of the packed chamber exceeds about 15 mm. Hg. Pressures below about 1 mm. Hg are not required for these purposes, however, and are more difficult to maintain. On the other hand, pressures of about 15 mm. Hg are easily attainable, so that the preferred pressure range in the lower portion of the packed chamber ranges from about 1 to about 15 mm. Hg.

The pressure within the packed chamber above the point at which the steam is introduced into the packed chamber, and particularly within the packing material, is less than in the lower portion of the packed chamber. This is due to the "pressure drop" described above, which prevents steam pressure from equalizing.

The pressure in the lower portion of the packed chamber can be directly controlled by that in the vapor line which removes steam and odoriferous materials. The pressure above the point at which oil is introduced into the chamber is essentially the same as that in the vapor line. The pressures throughout the packed chamber are thus directly controlled by the vacuum applied to the packed chamber.

Throughout this specification, reference is made to steam as the deodorization agent. Steam is highly preferred for this purpose, as it is readily available in high purity and because it does not injure the oils being deodorized. Other deodorization agents can be used, however, for example gases which are inert under the conditions of the process, such as nitrogen or hydrogen. Oxygen and air are unsuitable, however, as they would cause oxidation and degradation of the oils being deodorized.

Examples 1–15

The process of this invention was utilized to deodorize hydrogenated and unhydrogenated cottonseed and soybean oils in a deodorization zone containing packing, i.e., a packed chamber.

The packed chamber comprised a vertical cylindrical chamber casing, about 10 inches in diameter (cross sectional area about 0.545 square feet) and about 25 feet in height. In the lower portion of the chamber casing was placed an expanded metal support plate, about 24 inches from the lower end of the casing. The chamber was filled to a depth of about 10 feet with a packing material, namely, 1 inch "Pall rings" described above, having a packing factor of about 50. There was then placed within the chamber casing a U.S. Stoneware "Orifice" type oil redistributor. An additional 10 feet of 1 inch "Pall ring" packing material was added, for a total of about 20 feet of packing material. At the top of the packed chamber was placed a U.S. Stoneware "Weir" type oil distributor. The chamber casing, support plate, packing, oil redistributor and oil distributor were all constructed of AISI type 304 stainless steel.

Undeodorized oil was deaerated to a level of about 0.08% by volume of dissolved oxygen, by passing the oil at a temperature of about 200° F. through a gas-tight cylinder 6 inches in diameter and 3.6 feet in height, maintained at about 7 mm. Mg pressure. The oil was distributed in the upper portion of the cylinder on ⅝ inch Pall ring packing, and withdrawn from the lower portion of the cylinder. Steam (0.25%) was injected into the lower portion of the cylinder, countercurrent to the flow of oil, and withdrawn from the upper portion along with the removed oxygen.

The deaerated oil was then heated and introduced into the upper portion of the packed deodorization chamber at the varying temperatures indicated in the table below. The oil was allowed to flow downward through the packing material after having passed through the oil distributor which distributed the oil over the horizontal cross-sectional area of the chamber. The residence time of the oil within the packed chamber, i.e., the time required for the oil to pass through the 20 feet of packing material and reach the bottom of the chamber, was about 2 minutes.

Simultaneously, a feed stream of steam was introduced into the lower portion of the packed chamber, countercurrent to the flow of oil. This caused the odoriferous materials in the oil to be volatilized, whereby the oil was deodorized.

The deodorized oil was withdrawn from the lower portion of the packed chamber, below the support plate. The steam and volatilized odoriferous materials were withdrawn from the upper portion of the packing chamber, above the oil distributor, through a vapor line maintained at the pressure indicated below.

The feed ratio of oil to steam, the pressure in the vapor line and within the lower portion of the packed chamber at the point at which steam was introduced and initially contacted the oil, approximate average pressure drop per foot of packing material, and the inlet and outlet oil temperatures, varied for each example as specified in the table below. The inlet temperature of the steam was about 480° F. The temperature within the deodorization chamber for each example ranged from the specified oil inlet temperature (within the upper portion of the packed chamber) to the specified oil outlet temperature (within the lower portion of the packed chamber).

After being deodorized, the oils of each example were tasted by an expert panel and assigned a "flavor grade" based on a scale ranging from 1 to 10. Low numbers indicate the presence of undesirable flavors, and high numbers indicate their absence, i.e., bland oils. Ratings in excess of 7.5 are deemed to represent adequate deodorization. Prior to deodorization, the oils all had flavor grades less than 4.0.

For the various oils specified below and for the conditions indicated in each example, the results indicated were obtained. The type of oil is abbreviated as follows:

USBO—unhydrogenated soybean oil;
UCSO—unhydrogenated cottonseed oil;
HSBO—hydrogenated soybean oil;
HCSO—hydrogenated cottonseed oil

| Example: | Type of oil | Inlet oil temp., °F. | Outlet oil temp., °F. | Pressure in vapor line, mm. Hg. | Pressure drop in packed chamber, mm. Hg per foot of packing | Pressure in lower portion of packed chamber, mm. Hg. | Oil flow rate lbs. per hour | Oil flow rate, lbs. per hour per square foot | Steam flow rate, lbs. per hour | Feed ratio of oil to steam | Flavor grade observed |
|---|---|---|---|---|---|---|---|---|---|---|---|
| 1 | USBO | 445 | 430 | 4.8 | 0.385 | 12.5 | 2,000 | 3,680 | 20 | 100:1 | 8.25 |
| 2 | USBO | 455 | 440 | 6.0 | 0.095 | 7.9 | 1,500 | 2,750 | 7.5 | 200:1 | 7.6 |
| 3 | UCSO | 445 | 435 | 4.8 | 0.06 | 6.0 | 1,000 | 1,850 | 5.0 | 200:1 | 7.6 |
| 4 | UCSO | 450 | 435 | 4.0 | 0.12 | 6.4 | 1,000 | 1,850 | 7.5 | 133:1 | 7.8 |
| 5 | UCSO | 445 | 435 | 7.9 | 0.105 | 10.0 | 1,000 | 1,850 | 10 | 100:1 | 7.5 |
| 6 | UCSO | 400 | 390 | 5.6 | 0.105 | 7.7 | 1,500 | 2,750 | 7.5 | 200:1 | 7.5 |
| 7 | UCSO | 480 | 460 | 2.0 | 0.14 | 4.8 | 1,000 | 1,850 | 5 | 200:1 | 7.8 |
| 8 | UCSO | 480 | 460 | 13.2 | 0.08 | 14.8 | 1,000 | 1,850 | 5 | 200:1 | 8.2 |
| 9 | HSBO | 430 | 422 | 40.0 | 0.20 | 44.0 | 1,000 | 1,850 | 10 | 100:1 | 7.75 |
| 10 | HSBO | 460 | 435 | 0.3 | 0.07 | 1.7 | 1,500 | 2,750 | 2.3 | 650:1 | 8.2 |
| 11 | HSBO | 460 | 435 | 0.5 | 0.17 | 3.9 | 1,500 | 2,750 | 5 | 300:1 | 8.2 |
| 12 | HSBO | 460 | 435 | 0.5 | 0.25 | 5.5 | 1,500 | 2,750 | 10 | 150:1 | 8.3 |
| 13 | HSBO | 475 | 470 | 0.3 | 0.07 | 1.7 | 1,500 | 2,750 | 2.5 | 600:1 | 8.75 |
| 14 | HSBO | 475 | 460 | 5.9 | 0.17 | 9.3 | 1,000 | 1,850 | 10 | 100:1 | 8.25 |
| 15 | HCSO | 480 | 440 | 5.6 | 0.05 | 6.6 | 2,000 | 3,680 | 2 | 1,000:1 | 8.0 |

As can be seen from the above, by deodorizing edible oils according to the process of the present invention, a highly efficient and rapid deodorization is obtained as indicated by the low steam usage and short residence time.

Examples 16-30

When the above examples are repeated in a packed chamber 20 inches in diameter (2.18 square feet cross section) and 35 feet of 2 inch Pall rings as packing material, and with an oil flow rate of 13,000 pounds of oil per hour (about 6000 pounds per hour per square foot of packing), substantially similar deodorization results are obtained.

What is claimed is:

1. A process for continuously deodorizing an edible oil containing odoriferous material in a deodorization zone, the residence time of the oil within the deodorization zone ranging from about 30 seconds to about 10 minutes, which comprises continuously:
   (1) deaerating a feed stream of oil to be deodorized to a level of less than about 0.10% by volume of dissolved oxygen;
   (2) heating the deaerated oil to a temperature of about 350° F. to about 500° F.;
   (2) introducing the deaerated oil into the upper portion of a vertical deodorization zone containing a packing material having a packing factor less than about 100;
   (4) allowing the oil to flow downward through the deodorization zone;
   (5) introducing a feed stream of steam into the lower portion of the deodorization zone, countercurrent to the flow of oil, to volatilize the odoriferous materials in the oil and deodorize the oil;
   (6) withdrawing deodorized oil from the lower portion of the packed chamber; and
   (7) withdrawing the steam and the volatilized odoriferous materials from the upper portion of the deodorization zone;
the height of packing material ranging from about 3 to about 120 feet; the feed ratio of oil to steam ranging from about 1000:1 to about 100:1 by weight; the pressure within the lower portion of the deodorization zone ranging from about 0.1 to about 50 millimeters of mercury absolute; and the temperature within the deodorization zone ranging from about 350° F. to about 500° F.

2. The process of claim 1, in which the pressure within the lower portion of the deodorization zone ranges from about 1 to about 15 millimeters of mercury absolute and in which the pressure drop in the packed chamber ranges from about 0.05 to about 0.5 millimeter of mercury per foot of packing material.

3. The process of claim 2, in which the feed ratio of oil to steam ranges from about 400:1 to about 200:1 by weight.

4. The process of claim 3, in which the oil to be deodorized is deaerated to a level of less than about 0.05% by volume of dissolved oxygen.

5. The process of claim 4, in which the deaerated oil is heated to a temperature of about 450° F. to about 485° F., and in which the temperature within the deodorization zone ranges from about 410° F. to about 485° F.

6. The process of claim 5, in which the temperature of the feed stream of steam ranges from about 430° F. to about 505° F.

7. The process of claim 6, in which the packing material has a packing factor ranging from about 50 to about 70.

8. The process of claim 7, in which the height of packing material ranges from about 12 feet to about 24 feet.

9. The process of claim 8, in which the oil flow rate ranges from about 3000 to about 5200 pounds of oil per hour per square foot of packing material.

References Cited

UNITED STATES PATENTS

| 2,621,196 | 12/1952 | Thurman | 260—428 |
| 2,674,609 | 4/1954 | Beal et al. | 260—428 |
| 2,991,298 | 7/1961 | Raffaeta | 260—428 |

LEWIS GOTTS, Primary Examiner

E. G. LOVE, Assistant Examiner

U.S. Cl. X.R.

55—54